May 14, 1957  J. A. PERRY  2,792,191
PIVOTALLY MOUNTED AIRPLANE SUSTAINING WING STRUCTURE
Filed Feb. 8, 1954
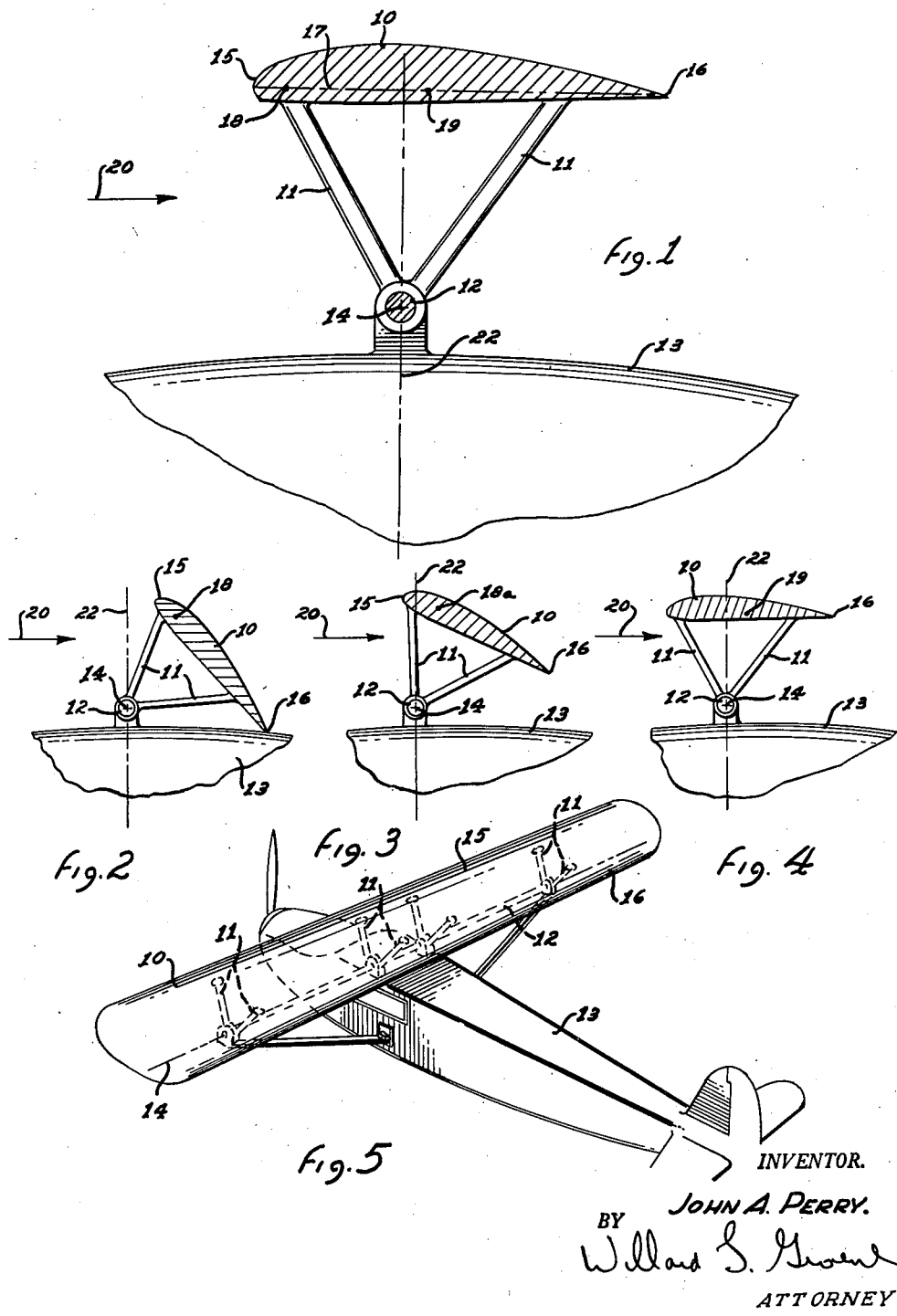
INVENTOR.
JOHN A. PERRY.
ATTORNEY

United States Patent Office 2,792,191
Patented May 14, 1957

2,792,191

PIVOTALLY MOUNTED AIRPLANE SUSTAINING WING STRUCTURE

John A. Perry, Phoenix, Ariz.

Application February 8, 1954, Serial No. 408,741

1 Claim. (Cl. 244—48)

This invention pertains to improvements in airplane sustaining wing structures.

This application is a continuation-in-part application of my earlier filed case Serial No. 201,378 filed December 18, 1950, for Aeroplane Structure, now abandoned.

One of the objects of this invention is to provide a sustaining wing for an airplane which is pivotally mounted in a critical position for free uncontrolled swinging movement on the fuselage of the airplane.

Another object of this invention is to provide a sustaining wing for an airplane which is mounted for free swinging movement in a particular position on the fuselage of the airplane so that the center of pressure of the wing remains behind the axis of swinging movement of the wing under all flight conditions.

Still another object of this invention is to provide a freely pivotally mounted sustaining wing located in a predetermined critical position on the fuselage of an airplane without any physical restrictive control so that the wing adjusts its lift and drag with respect to the relative wind as determined by the forward speed of the plane to automatically compensate for variations in plane speed and air density without attention or control upon the part of the pilot.

A further object is to provide an airplane with a sustaining wing which is pivotally mounted for free swinging movement on a horizontal transverse axis on the fuselage of the airplane located relative to said wing so that said horizontal transverse axis is positioned in front of the center of pressure of said wing under all flight conditions.

Another object of this invention is to provide a sustaining wing structure for an aircraft which is freely movably mounted on the fuselage under the sole control of the relative wind so that under all flight conditions the center of pressure of the wing is automatically maintained behind the point of application of flight forces on the airplane structure.

Still a further object of this invention is to provide an airplane with a freely pivotally mounted sustaining wing which automatically responds to all flight conditions to maintain stable equilibrium of flight without requiring attention, skill, adjustment or control upon the part of the pilot.

Further features and advantages of this invention will appear from a detailed description of the drawings in which:

Fig. 1 is an enlarged fragmentary diagrammatic view showing a pivotally mounted sustaining wing or airfoil structure incorporating the features of this invention.

Fig. 2 shows the position of the pivotally mounted wing of Fig. 1 when the airplane is at rest with no relative wind present.

Fig. 3 is a view similar to Fig. 2 shown at the beginning of acceleration of the relative wind toward flying speed of the airplane.

Fig. 4 is a view similar to Figs. 2 and 3 showing the wing under flying conditions.

Fig. 5 shows an exemplary embodiment of the pivotally mounted wing in an aircraft.

For illustrative purposes there is shown a wing or airfoil section 10 of desired characteristics to which is fixed the support means or struts 11 pivotally mounted on the horizontal transverse pivot shaft 12 supported on the fuselage 13 of the airplane. The airfoil 10 is free to swing about an axis of pivoting 14 for bodily fore and aft movement relative to the fuselage 13. The airfoil 10 has the leading edge 15 and the trailing edge 16 and the chord 17. The airfoil 10 is characterized by the usual center of pressure which may shift along the chord 17 between the positions 18 and 19 in response to variations in the angle of attack of the airfoil to the direction of the relative wind 20. It is important to note that the pivot axis 14, which is the point of application of flight forces on the airplane structure, is critically positioned relative to the airfoil 10 so that under all flight conditions the center of pressure of the airfoil remains behind the axis 14. The axis of pivoting lies in a plane 22 which is at right angles to the relative wind or flight path, said plane being positioned under all flight conditions in front of the center of pressure of the airfoil. In this arrangement the pivot axis is critically positioned in a predetermined relationship to the airfoil so that drag and the weight of the wing provides a positive movement of rotation of the airfoil 10 (in a clockwise direction in Figs. 1, 2, 3 and 4) of swinging of the wing on the fuselage of the airplane. The wing structure is at all times biased by the lift on the airfoil 10 caused by the relative wind in a forward swinging negative counter-clockwise direction by this arrangement to automatically compensate for the backward swinging movement (clockwise in Figs. 1, 2, 3 and 4) of the wing caused by drag and the weight of the wing structure.

The operation and behavior of a pivotal wing structure constructed as recited above is clearly shown in Figs. 2, 3 and 4. At no air speed, Fig. 2, the wing rests backwardly in the position shown with the leading edge 15 well above the trailing edge 16 for maximum angle of attack of the airfoil. As the airflow in the direction indicated by the arrow 20 is applied to the wing, the center of pressure develops at 18. As the airflow increases in takeoff, the wing swings counter-clockwise as indicated in Fig. 3 and the center of pressure passes through the point 18a. High speed flight conditions are shown in Fig. 4 with the center of pressure located at the point 19. Any decrease in forward speed of the wing in regard to the relative wind causes the wing to tend to swing toward the position shown in Fig. 3 to increase the angle of attack and at the same time tends to maintain the same amount of lift even though the flying speed has decreased. This play of forces on the pivotal wing takes place in response to flight condition without any attention or control being required of the pilot. Further, it will be noted that the center of pressure 18—18a—19 is at all times in back of the plane 22 passing through the pivot axis.

Variations in air pressure or density of the air mass through which the airplane is traveling is automatically compensated for to make up the difference for the variations in lift of such variable air masses by the automatic free swinging action about the axis 14 during flight. Thus, there has been provided an improved automatic lift compensator for aircraft which automatically adjusts itself to variations in flying speed and variations in air density without attention upon the part of the pilot.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim are intended to be included herein.

Having thus fully set forth and described this invention what is claimed and desired to be obtained by the United States Letters Patent is:

An airplane sustaining wing structure comprising, a wing having a center of pressure, a fuselage, and a pivotal connection between said wing and said fuselage for free uncontrolled relative fore and aft movement of said wing on said fuselage, said connection being critically positioned relative to said wing so that said wing under all flight conditions automatically moves forward under the influence of the relative wind and moves rearwardly under the influence of drag and weight of the wing, said critical location of said pivotal connection being defined by its location to the wing such that said center of pressure of said wing at all times remains behind a plane at right angles to the relative wind, said plane passing through said pivotal connection.

References Cited in the file of this patent
UNITED STATES PATENTS 2,623,712     Spratt _____ Dec. 30, 1952